April 7, 1953            A. A. MARTIN            2,634,169
AXLE
Filed April 8, 1949
FIG. 1.
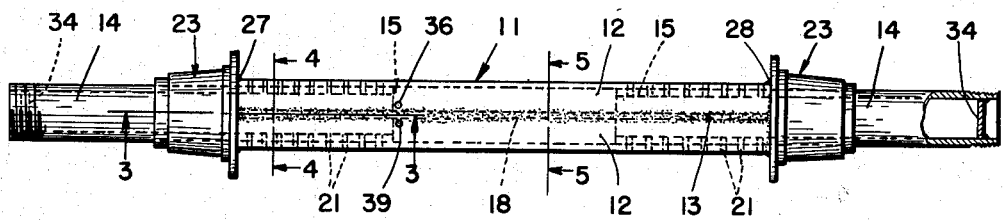
FIG. 2.
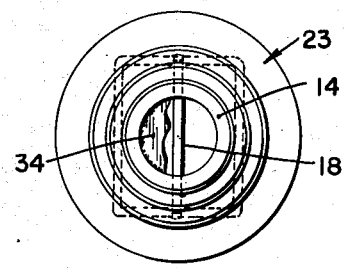
FIG. 4.
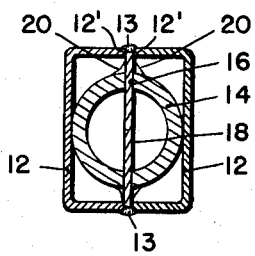
FIG. 3.
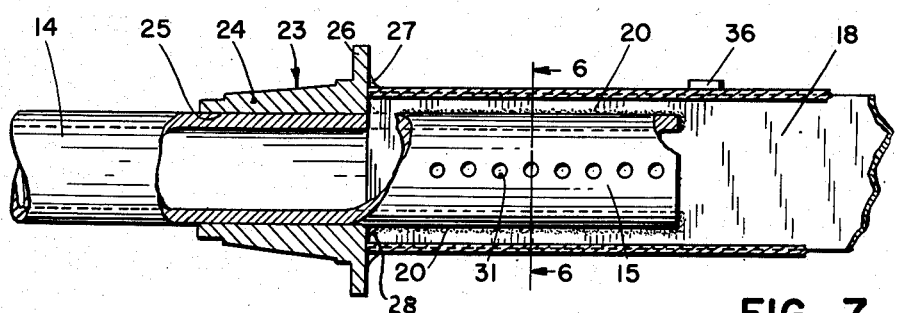
FIG. 6.
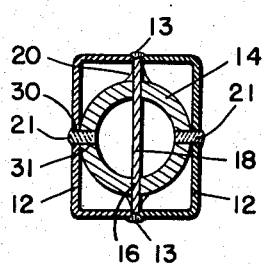
FIG. 5.
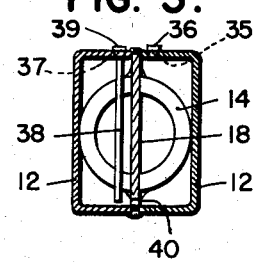
FIG. 7.
INVENTOR
AUGUST A. MARTIN
BY
*Mason & Graham*
ATTORNEYS Patented Apr. 7, 1953

2,634,169

UNITED STATES PATENT OFFICE 2,634,169

AXLE

August A. Martin, Los Angeles, Calif., assignor, by mesne assignments, to Pacific Freight Lines, a corporation of California Application April 8, 1949, Serial No. 86,180

4 Claims. (Cl. 301—132)

This invention has to do generally with axles for vehicles, such as trailers and the like, and the invention resides particularly in the provision of a novel axle construction.

A primary object of the invention is to provide a relatively lightweight axle having greater strength than conventional axles of comparable size in use today.

Another object of the invention is to provide an axle which is easy to fabricate and can be made from standard structural steel shapes. In this connection, a further object is to provide an axle construction in which all the parts can be secured together by welding.

Another object is to provide an axle having a central section of rectangular cross-sectional shape whereby the same can be readily installed or mounted on a vehicle.

A still further object of the invention is to provide an axle which has great resistance to bending and to torsional stresses.

Another object is to provide an axle construction which provides a fluid storage chamber which may be used to store air under pressure for operating the brakes of the vehicle or which may be used for storing other fluids.

These and other objects will be apparent from the drawing and the following description thereof.

Referring to the drawing, which is merely illustrative of one embodiment of the invention:

Fig. 1 is a plan view of an axle embodying the invention;

Fig. 2 is an end elevational view of the axle of Fig. 1;

Fig. 3 is an enlarged fragmentary longitudinal sectional view on the line 3—3 of Fig. 1;

Fig. 4 is a cross section on line 4—4 of Fig. 1;

Fig. 5 is a cross section on line 5—5 of Fig. 1 drawn to the same scale as Fig. 4;

Fig. 6 is a cross section on line 6—6 of Fig. 3; and

Fig. 7 is an elevational view of one of the spindles.

More particularly describing the invention, reference numeral 11 generally indicates a housing or central section of the axle. This section is composed of a pair of channel members 12 which are disposed facing each other and are secured by welds 13 forming an elongated box-like central section. The axle includes a pair of hollow spindles 14 which are mounted in the ends of the central section 11 and project therefrom. The inner portions of the spindles, indicated by 15, are provided with a pair of aligned longitudinal slots 16 which receive the ends of an elongated plate 18 which extends longitudinally of the section 11 and centrally thereof. Preferably, this plate is parallel to the bases of the channels 12, or parallel to the longest sides of the central section which is in the cross-sectional form of an elongated rectangle as appears in Fig. 4. The plate is welded to each of the spindles in the region of the slots as indicated at 20, so that the spindles are securely fastened to the plate. The plate is also welded along its edges to the channels 12 by the welds 13. In this connection preferably the width of the plate is such that the plate extends between the adjacent edges of the two channels.

The spindles are also secured to the central section 11 by means of plug welds 21 which are located along each side of the spindles in a plane which is substantially at right angles to the plane of the plate 18. In this connection it may be noted that the outer diameter of the spindles is substantially the same as the distance between the inner walls of the section 11 in a plane at right angles to the plate 18.

Mounted on each spindle is a tubular flanged member 23 which includes a tubular section 24 having a cylindrical bore 25. This section terminates in a flange 26 which abuts the ends of the central section 11 and the parts are secured by welds 27. Welds 28 join the members 23 to the spindles.

It will be apparent that the axle may be readily fabricated from standard steel structural shapes. In manufacture, the ends of the spindles are slotted at 16 to receive the plate 18 which is then welded to the spindles. The tubular flanged members 23 are then mounted on the spindles preferably by either a forced or shrinkage fit. By the use of suitable jigs, the channels 12 may then be placed around the plate and inner ends of the spindles with the edges 12' of the channels 12 abutting the sides of the plate 18 marginal to the edges thereof. After the channels 12 and the spindles and plate have been welded together, holes 30, 31 in the channels and spindles, respectively, may be bored, and these filled by welding to form the plug welds 21.

It is a feature of this invention that the axle may be used as a fluid storage member and as an air storage tank, the air being useful for operating the brakes of the vehicle. In order to accomplish this, the spindles 14 are provided with plugs 34 which may be welded in place. With this construction, the interior of the axle is completely sealed. A threaded opening 35, shown closed by a plug 36, may be provided in the central section for admitting and withdrawing the fluid. If desired, a drain opening 37 may also be provided, and in the form of the invention shown I have indicated a tube 38 leading from this opening to the bottom of the axle. The opening 37 is normally closed by a plug 39. To provide drainage to both sides of plate 18, one or more small holes 40 are provided in the plate.

Although the invention has been particularly shown and described, it is contemplated that various changes and modifications can be made without departing from the scope of the invention as set forth in the claims.

I claim:

1. An axle comprising an elongated box-like central section, a spindle projecting into each end of said section, the projected ends of said spindles being slotted, an elongated plate mounted centrally of said central section and having its ends received in the slotted ends of said spindles, said plate being secured to said central section and to said spindles by welds, and additional welds securing said spindles to said central section, said additional welds being in a plane at right angles to the plane of said plate.

2. An axle comprising an elongated box-like central section, a hollow spindle projecting into each end of said section, the projected ends of said spindles being slotted, an elongated plate mounted centrally of said central section and having its ends received in the slotted ends of said spindles, said plate being secured to said central section and to said spindles, a tubular flanged member on each spindle in abutment with the end of said central section and welded thereto and to the spindle, and a plug in each spindle, said axle forming an enclosed chamber for the storage of fluid, said central section having an opening for the introduction and removal of fluid.

3. A welded axle construction comprising an elongated central section formed of a pair of opposed channel members and an elongated plate therebetween, the edges of said channel members and of said plate being secured together by welds, a hollow spindle in each end of said central section, said spindles being of a diameter such that the channel members are substantially tangential thereto and said spindles being slotted to receive said plate, welds securing said spindles to said plate in the region of the slots, welds securing said spindles to said channel members along the region of tangency of the channel members to said spindles, and a flanged member mounted on each spindle in abutment with the end of said central section and welded thereto.

4. A welded axle construction comprising an elongated central section of box-like cross-sectional shape, a tubular spindle mounted in each end of said central section and projecting outwardly therefrom, the inner end of each spindle being slotted, an elongated plate having its ends received in the slotted ends of said spindles and being secured thereto and to said central section by welds, and a tubular flanged member on each spindle in abutment with the ends of said central section secured to said central section by welds, said tubular flanged member including an extended portion projecting axially outward of the flange thereof for a substantial distance, no portion of said extended portion having a diameter greater than the portion thereof immediately adjacent the flange.

AUGUST A. MARTIN.

REFERENCES CITED

The following references are of record in the file of this patent:

UNITED STATES PATENTS

| Number | Name | Date |
|---|---|---|
| 120,418 | Cremin | Oct. 31, 1871 |
| 925,537 | Walbridge | June 22, 1909 |
| 2,025,343 | Oelkers | Dec. 24, 1935 |
| 2,155,156 | Townsend | Apr. 18, 1939 |
| 2,170,522 | Voorhees | Aug. 22, 1939 |
| 2,370,641 | Dewey | Mar. 6, 1945 |
| 2,452,659 | Huldt | Nov. 2, 1948 |

FOREIGN PATENTS

| Number | Country | Date |
|---|---|---|
| 659,264 | Germany | Mar. 31, 1938 |
| 665,172 | Germany | Sept. 19, 1938 |
| 686,438 | Germany | Jan. 9, 1940 |